(12) United States Patent
Saiga et al.

(10) Patent No.: US 9,827,890 B2
(45) Date of Patent: Nov. 28, 2017

(54) COVER FASTENING CLIP

(71) Applicant: YKK Corporation, Tokyo (JP)

(72) Inventors: Shinsuke Saiga, Tokyo (JP); Tetsuya Yoshino, Novi, MI (US); Yoshitomo Iyoda, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/030,769

(22) PCT Filed: Nov. 1, 2013

(86) PCT No.: PCT/JP2013/079684
§ 371 (c)(1),
(2) Date: Apr. 20, 2016

(87) PCT Pub. No.: WO2015/063944
PCT Pub. Date: May 7, 2015

(65) Prior Publication Data
US 2016/0264030 A1      Sep. 15, 2016

(51) Int. Cl.
*B60N 2/58*   (2006.01)
*B68G 7/12*   (2006.01)
*A47C 31/02*  (2006.01)

(52) U.S. Cl.
CPC .......... *B60N 2/5825* (2013.01); *A47C 31/023* (2013.01); *B68G 7/12* (2013.01)

(58) Field of Classification Search
CPC ............... Y10T 24/309; Y10T 24/3449; Y10T 24/3485; Y10T 24/44017; B60N 2/5825; B68G 7/12; A47C 31/023
See application file for complete search history.

(56) References Cited

U.S. PATENT DOCUMENTS

| | | |
|---|---|---|
| 4,691,416 A | 9/1987 | Nakayama et al. |
| 6,048,025 A | 4/2000 | Tillner |
| 6,122,806 A | 9/2000 | Umezawa et al. |

(Continued)

FOREIGN PATENT DOCUMENTS

| | | |
|---|---|---|
| DE | 19544850 A1 | 6/1997 |
| EP | 0359643 A1 | 3/1990 |

(Continued)

OTHER PUBLICATIONS

International Search Report, PCT Application No. PCT/JP2013/079684, dated Dec. 10, 2013.

*Primary Examiner* — Robert J Sandy
(74) *Attorney, Agent, or Firm* — Kilpatrick Townsend & Stockton LLP

(57) ABSTRACT

A cover fastening clip includes a locking section that locks with an end member to be locked that is provided on the edge of a cover, and a hook that engages with a wire disposed in a groove of a cushion material. The hook is provided with an extended section that extends down from the locking section and a claw-shaped section, and the locking section is provided with a guide piece. The guide piece extends down along the extended section of the hook, bends at a midway bending section, and extends toward the distal end of the claw-shaped section. A wire insertion opening that has a prescribed gap and into which the wire is inserted is formed by the distal end of the guide piece reaching a location that faces the distal end of the claw-shaped section.

10 Claims, 6 Drawing Sheets

(56) References Cited

U.S. PATENT DOCUMENTS

| | | | | |
|---|---|---|---|---|
| 2007/0257531 A1* | 11/2007 | Mashimo | ............ | B60N 2/5825 |
| | | | | 297/218.3 |
| 2009/0140569 A1* | 6/2009 | Mashimo | ............ | B60N 2/5825 |
| | | | | 297/452.59 |
| 2012/0284974 A1* | 11/2012 | Yamamoto | ........... | A47C 31/023 |
| | | | | 24/458 |

FOREIGN PATENT DOCUMENTS

| | | |
|---|---|---|
| JP | 11-318647 A | 11/1999 |
| JP | 2006-122594 A | 5/2006 |
| JP | 2012-235911 A | 12/2012 |
| WO | 2012/017986 A1 | 2/2012 |

\* cited by examiner

Related Art

COVER FASTENING CLIP

This application is a national stage application of PCT/JP2013/079684, which is incorporated herein by reference.

TECHNICAL FIELD

The present invention relates to a cover material fastening clip configured to fasten a cover material for covering a surface of a chair, a seat or the like.

BACKGROUND ART

In the related art, for a chair to be used in a room, a seat in a vehicle and the like, a cushion material or a soft pad of which a surface is covered by a cover material is frequently for a part to be touched by a human body such as a seat surface and a back rest. For fixing the cover material, a variety of structures have been adopted. As a structure capable of fixing the cover material and concealing the structure from an outside, a structure where a wire is disposed in a groove of the cushion material, clips are arranged at an edge of the cover material and the clips are engaged to the wire to fasten the cover material has been known.

For example, a cover material fastening clip disclosed in Patent Document 1 or 2 has a chuck part to be locked to a locking end portion attached to a cover material and a hook part to be hooked and locked to a wire provided in a groove of a cushion material. The hook part has a guide piece and a hook arranged side by side to face each other. When a wire is inserted between the guide piece and the hook, the guide piece is bent outwards to widen a gap between the guide piece and the hook, and when the wire is further inserted, the hook is hooked and locked to the wire inserted in the gap.

An example of the cover material fastening clip having the guide piece is shown in FIG. 10. A cover material fastening clip 1 shown in FIG. 10 has a locking part 2 consisting of a pair of locking claws to be locked to a locking end portion attached to a cover material, a hook 3 to be hooked and locked to a wire 6 provided in a groove of a cushion material, and a guide piece 4 arranged side by side to face the hook 3. The hook 3 has an extension portion 3a extending downwards in FIG. 10, a claw-shaped portion 3c bent leftwards from a leading end of the extension portion 3a in FIG. 10 and inclined slightly upwards, and a flange portion 3b extending in an opposite direction (a right direction in FIG. 10) to the extension direction of the claw-shaped portion 3c. The flange portion 3b is inclined so that a leading end thereof faces downwards, and the leading end of the flange portion 3b is provided with a jig support part 5 configured to lock a jig for removing the hook 3 from the wire 6. The guide piece 4 bends and extends downwards, extends through a lateral side of the claw-shaped portion 3c of the hook 3 and reaches a lateral side of the substantially same position as a lower end portion of the flange portion 3b. The cover material fastening clip 1 is configured so that when the wire 6 is inserted between the guide piece 4 and the hook 3, the guide piece 4 is bent outward to widen a gap between the guide piece and the hook 3 and when the wire is further inserted, the hook 3 is hooked and locked to the wire 6 inserted in the gap.

In addition, Patent Document 3 discloses a configuration of hooking and locking the hook to the wire. In the configuration, an opening provided at an upper part of the hook is provided with an elastically deformable cantilever-type closing piece.

PRIOR ART DOCUMENT

Patent Document

Patent Document 1: Japanese Patent Application Publication No. 2012-235911A
Patent Document 2: WO 2012/017986
Patent Document 3: U.S. Pat. No. 4,691,416B

SUMMARY OF INVENTION

Problems to be Solved by Invention

When bringing the cover material fastening clip 1 shown in FIG. 10 close to the wire 6 for locking, if the cover material fastening clip is inclined, the wire 6 comes outside the guide piece 4, so that it may not be hooked to the hook 3, because the guide piece 4 extends below the hook 3, as shown in FIG. 10. In this case, it is necessary to correct a posture of the hook 3 and to again insert the hook, so that it is troublesome to perform the locking operation of the hook 3. Also, a range in which the wire 6 is to be inserted to the hook 3 is narrow. Therefore, for the correct insertion, it is necessary for the wire 6 to be seen by pushing and deforming the surrounding cushion material and the like, so that a strong force is required for the operation and the operation is not thus easy. In particular, when it is intended to push and lock the cover material fastening clip 1 to the wire 6 with a finger, the guide piece 4 is likely to be inclined downwards, as shown in FIG. 10, so that the wire 6 is located outside the guide piece 4 in many cases. As a result, the wire 6 is difficult to be engaged with the hook 3.

Also in the cover material fastening clips disclosed in Patent Documents 1 and 2, the guide piece extends long, so that the guide piece is difficult to be hooked to the wire.

Also, according to the hook member disclosed in Patent Document 3, since the opening is provided at the upper part of the hook, it is necessary to push down the hook below the wire for locking and unlocking with the wire, so that the force is required and the using thereof is difficult. Further, since the opening is closed by the closing piece, when removing the wire, it is necessary to perform the operation with the closing piece being opened, so that it is difficult to perform the operation.

The present invention has been made in view of the above-described problems, and an object of the present invention is to provide a cover material fastening clip that can be efficiently locked to a wire provided in a cushion material or the like by a simple operation.

Means for Solving Problems

According to the present invention, there is provided a cover material fastening clip, which includes a locking part configured to be locked to a locking end member provided at an edge of a cover material and a hook configured to be locked to a wire disposed in a groove of a cushion material, wherein the cover material fastening clip is configured to couple the cover material and the cushion material. The hook is provided below the locking part, and is provided with an extension portion extending downwards from the locking part and a claw-shaped portion bent laterally from a leading end of the extension portion and inclined towards the locking part. The locking part is provided with a guide piece. The guide piece extends downwards from the locking part, has a bent portion in the middle thereof and bends and extends towards a leading end portion of the claw-shaped portion of the hook. A leading end portion of the guide piece reaches a position facing the leading end portion of the claw-shaped portion with a wire insertion opening having a predetermined gap in which the wire is to be inserted. Parts of the guide piece and the claw-shaped portion facing towards the wire insertion opening are respectively formed with guide surfaces.

A gap between the guide surfaces of the guide piece and the claw-shaped portion becomes gradually smaller towards the wire insertion opening. Also, the leading end portion of the guide piece may be located above the leading end portion of the claw-shaped portion. Also, the leading end portion of the guide piece may extend beyond the leading end portion of the claw-shaped portion and may be located at a side of the extension portion of the hook.

The claw-shaped portion of the hook has a linear inclined surface, and the bent portion is provided above an extension line along the inclined surface towards the guide piece. Also, the pair of guide surfaces forms a triangular oblique side-shaped introduction passage expanded downwards.

The guide piece extends in a direction away from the extension portion as it goes downwards from the locking part, and is provided with the bent portion, so that the guide piece bends and extends towards the leading end portion of the claw-shaped portion of the hook.

Also, the hook has a flange portion extending in an opposite direction to an extension direction of the claw-shaped portion of the extension portion. The flange portion has a leading end inclined in a direction away from the locking part, and the leading end of the flange portion is provided with a jig support part configured to lock a jig for removing the hook from the wire.

The locking part, the hook, the jig support part and the guide piece are formed by an integral molding of a synthetic resin.

Advantageous Effects of Invention

According to the cover material fastening clip of the present invention, it is possible to easily lock the hook to the wire disposed in the cushion material or the like by a simple operation, thereby attaching the cover material to the cushion material easily and securely. Upon the locking operation, even when the cover material fastening clip is pushed from above by fingers and is thus inclined, it is possible to engage the wire to the hook at the inclines state and to easily lock the wire to the hook by the fingers, which improves the operation efficiency. Also, since the pair of guide surfaces forms the triangular oblique side-shaped introduction passage facing towards the wire insertion opening, it is not necessary to correctly position the wire, and it is possible to guide the wire within a wide range, so that it is possible to securely guide and lock the wire to the wire insertion opening.

Also, the leading end portion of the guide piece is located above the leading end portion of the claw-shaped portion, so that it is possible to lengthen the guide surfaces to the wire insertion opening and thus to easily guide the wire upon the insertion. Also, the leading end portion of the guide piece extends beyond the leading end portion of the claw-shaped portion and is positioned at the side of the extension portion of the hook, so that it is possible to securely guide the wire to a position at which it is to be locked by the claw-shaped portion. Also, at the locked state, it is possible to reduce a moving range of the wire, so that the locked state can be easily kept.

EMBODIMENTS OF INVENTION

Figure 1:
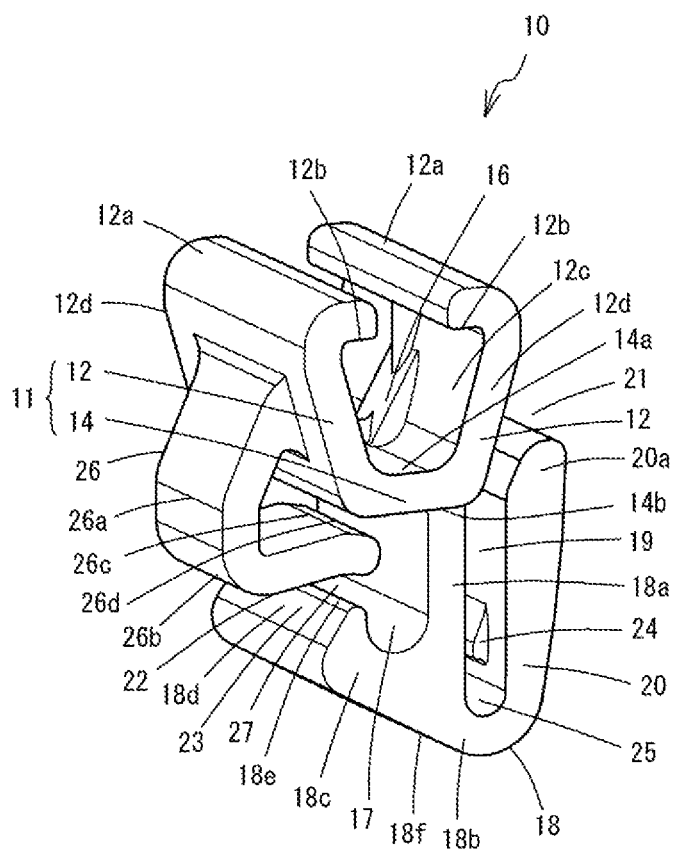
FIG. 1 is a perspective view of a cover material fastening clip according to an illustrative embodiment of the present invention.

Hereinafter, illustrative embodiments of the present invention will be described with reference to the drawings. In below descriptions of a cover material fastening clip 10, directions are described on the basis of XYZ directions orthogonal to each other (refer to FIG. 2). Herein, an X-axis direction is referred to as a front-rear direction. For example, the X-axis direction coincides with an extension direction of a wire 36 disposed at a deep portion of a groove 34 of a cushion material 30 or coincides with an extension direction of an edge of a cover material 32 (which will be described later). Also, the X-axis direction coincides with an extension direction of an edge of a locking end member 42 (which will be described later). A direction along which the locking end member 42 is inserted into the groove 34 of the cushion material 30 and is locked to the wire 36 is referred to as an upper-lower direction. The upper-lower direction is a Z-axis direction orthogonal to the X-axis direction, and coincides with a depth direction of the cushion material 30. Also, the upper-lower direction coincides with a direction perpendicular to a surface of the cover material 32 (which will be described later) stretched on the cushion material 30. Also, a direction orthogonal to the X-axis direction (front-rear direction) and the Z-axis direction (upper-lower direction) is denoted as a Y-axis direction and is also referred to as a left-right direction. A direction parallel with the left-right direction is also referred to as a lateral side.

FIG. 1 depicts an illustrative embodiment of the present invention. In the illustrative embodiment, the cover material fastening clip 10 is integrally molded with a synthetic resin, and has a pair of locking claws 12. The locking claws 12 have arm parts 12d formed to face each other. Base end portions (which are also base end portions of the locking claws 12) of the arm parts 12d are integrally formed from both sides of an upper surface 14a (also referred to as one surface of a locking claw base part 14) of the locking claw base part 14. The locking claws 12 protrude upwards from the upper surface 14*a* in FIG. 1, and are formed so that a gap therebetween in the left-right direction becomes greater in an upper direction. The locking claws 12 and the locking claw base part 14 configure a locking part 11. Leading end portions 12*a* of the locking claws 12 are respectively bent inwards, i.e., in a direction in which they face each other and come close to each other. Each of the leading end portions 12*a* has a locking surface 12*b* facing the locking claw base part 14 and configured to be locked to the locking end member 42. The locking surface 12*b* is formed to be substantially parallel with the upper surface 14*a* of the locking claw base part 14. The locking end member 42 is accommodated and locked in a space surrounded by the pair of locking claws 12 and the locking claw base part 14.

Inner surfaces 12*c* of the arm parts 12*d* of the pair of locking claws 12, which face each other, are provided with stoppers 16. The stoppers 16 are projections provided at an intermediate position of a thickness direction, which is the X-axis direction intersecting with the facing direction of the locking claws 12, start from the locking surfaces 12*b* of the locking claws 12 and reach the upper surface 14*a* of the locking claw base part 14 along the inner surfaces 12*c*, and form a substantial U shape, which is the same as a shape formed by the inner surfaces 12*c* and the upper surface 14*a* of the locking claw base part 14. A width in the thickness direction of the stopper 16 is narrowest at a part close to the locking surface 12*b* and is widest at a boundary part between the inner surface 12*c* continuing thereto and the upper surface 14*a*, and an intermediate width thereof is formed at a central portion of the upper surface 14*a*.

A lower surface 14*b* (also referred to as the other surface of the locking claw base part 14) of the locking claw base part 14 opposite to the upper surface 14*a* is provided with a hook 18. The hook 18 is provided at one end portion of the lower surface 14*b* in the facing direction of the pair of locking claws 12, and has an extension portion 18*a* extending downwards in a direction substantially perpendicular to the lower surface 14*b* and a claw-shaped portion 18*c* bent leftwards from a leading end of the extension portion 18*a* in FIG. 3 and inclined towards the locking part 11. The claw-shaped portion 18*c* is upwardly inclined towards the locking claw base part 14. An end portion of the claw-shaped portion 18*c* has a shape as if it is cut into a planar surface 18*d* substantially perpendicular to an inclined surface 18*f*, which is a lower surface of the claw-shaped portion 18*c*. An upper end edge portion of the planar surface 18*d* is a leading end portion 18*e* of the claw-shaped portion 18*c*, more protrudes than the claw-shaped portion 18*c* towards the locking claw base part 14, and has a tapered leading end. A U-shaped groove surrounded by the extension portion 18*a*, the claw-shaped portion 18*c* and the leading end portion 18*e* is a wire holding space 17 in which a wire 36 (which will be described later) is to be inserted. In the meantime, when seen from the Y-Z plane shown in FIG. 3, the inclined surface 18*f* is not limited to a straight line and may be a curved shape such as a downwardly convex shape or an upwardly concave shape.

A leading end of the extension portion 18*a* of the hook 18 is provided with a flange portion 18*b* extending in an opposite direction (a right direction of FIG. 3) to the extension direction of the claw-shaped portion 18*c*. The flange portion 18*b* is formed to be inclined so that a leading end portion thereof opposite to the claw-shaped portion 18*c* faces downwards, and the leading end portion is provided with a jig support part 20 configured to support a jig (not shown). The jig support part 20 extends from the leading end portion of the flange portion 18*b* to be substantially parallel with the extension portion 18*a* with a gap therebetween towards the locking claw 12, and a leading end portion 20*a* thereof reaches a slightly higher position than the upper surface 14*a* of the locking claw base part 14 and is positioned at a lateral side of the locking claw base part 14. A thickness in the left-right direction of the jig support part 20 is thin at a portion close to the flange portion 18*b* and becomes greater in a direction of coming closer to the locking claw base part 14, and the leading end portion 20*a* is formed with an inclined surface that is expanded outwards along an outer surface of the arm part 12*d* of the locking claw 12. A gap between the leading end portion 20*a* of the jig support part 20 and the locking claw base part 14 becomes a jig insertion opening 21 into which the jig is to be inserted. A U-shaped groove 19, which continues from the jig insertion opening 21, is surrounded by the extension portion 18*a*, the flange portion 18*b* and the jig support part 20 and the jig is to be inserted therein, is formed. A bottom (an upper surface of the hook 18) of the groove 19 is a jig holding space 25 for locking the jig. An inner surface (a surface facing the groove 19 in which the jig is to be inserted) of the jig support part 20 facing the extension portion 18*a* of the hook 18 is provided with an engaging protrusion 24 in the vicinity of the flange portion 18*b*. The jig holding space 25 is defined by the groove 19 and the engaging protrusion 24 (which will be described later) and a locking part of the jig is to be locked therein. The engaging protrusion 24 is a triangular projection facing towards the extension portion 18*a*, and protrudes to be closer to the extension portion 18*a* as it goes downwards. That is, the engaging protrusion 24 is formed so that a surface close to the flange portion 18*b* is positioned to be substantially perpendicular to a protrusion direction of the jig support part 20 and an opposite surface to the flange portion 18*b* intersects with the extension direction of the jig support part 20 at an acute angle. Thereby, when the jig is inserted into the groove 19, a part of the jig overrides a surface, which intersects at an obtuse angle, and is then locked to the engaging protrusion 24.

One of the pair of locking claws 12, which is opposite to the locking claw 12 provided at a side at which the jig support part 20 is formed, is provided with a guide piece 26 integrated with the corresponding locking claw 12. The guide piece 26 is provided in the vicinity of an intermediate part in the protrusion direction of the locking claw 12, extends in an inclined direction facing towards a downward side as it is spaced from the locking claw 12, has a first bent portion 26*a* provided in the vicinity of the lateral side of the lower surface 14*b* of the locking claw base part 14, is bent at the first bent portion 26*a* and extends downwards in a vertical direction to be parallel with the extension portion 18*a* of the hook 18. The guide piece has a second bent portion 26*b* provided on an extension line in the extension direction of the claw-shaped portion 18*c* of the hook 18, and is bent at the second bent portion 26*b* at an angle slightly greater than 90° with respect to the extension direction of the first bent portion 26*a* towards a boundary between the extension portion 18*a* and the lower surface 14*b*. A leading end portion 26*d* of the bent guide piece 26 reaches a position close to the extension portion 18*a* beyond the extension line of the leading end portion 18*e* of the claw-shaped portion 18*c*. A third bent portion 26*c* is provided at a position facing the leading end portion 18*e* of the claw-shaped portion 18*c* between the second bent portion 26*b* and the leading end portion 26*d* of the guide piece 26. The third bent portion 26*c* is bent to be convex towards the locking claw base part 14, and the leading end portion 26d slightly protrudes towards a direction away from the locking claw base part 14. A gap between the third bent portion 26c of the guide piece 26 and the leading end portion 18e of the claw-shaped portion 18c of the hook 18 becomes a wire insertion opening 27 in which the wire 36 is to be inserted.

The wire insertion opening 27 is set to be smaller than a diameter of the wire 36. A lower surface of the guide piece 26 between the second bent portion 26b and the third bent portion 26c becomes a guide surface 22 inclined towards the wire insertion opening 27. The planar surface 18d of the leading end-side of the claw-shaped portion 18c becomes also a guide surface 23 inclined towards the wire insertion opening 27. The guide surfaces 22, 23 are formed so that a gap therebetween becomes gradually smaller towards the wire insertion opening 27. Thereby, an introduction passage having a triangular oblique-side shape is formed. Also, the leading end portion 26d of the guide piece 26 is located at a position close to the extension portion 18a beyond the leading end portion 18e of the hook part 18, and the leading end portion 26d of the guide piece 26 is located above the wire holding space 17. Thereby, when inserting the wire 36, it is possible to smoothly guide the wire 36 into the wire holding space 17. Also, it is possible to suppress the locked wire 36 from erroneously moving, thereby keeping the stable locking. Also, the gap between the leading end portion 26d of the guide piece 26 and the extension portion 18a of the hook part 18 is set to be smaller than the diameter of the wire 36, so that it is possible to further suppress the movement of the locked wire 36.

Figure 2:
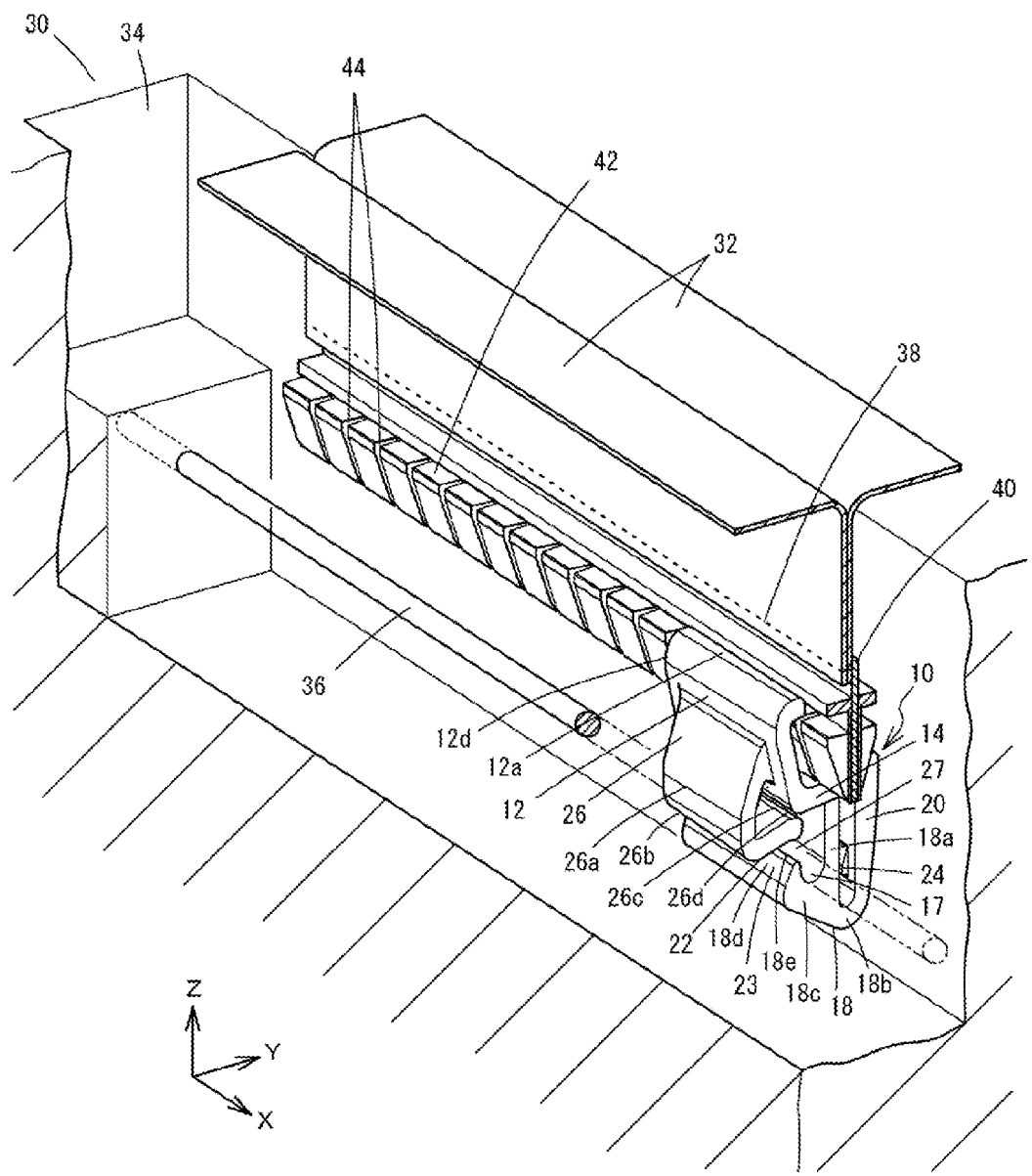
FIG. 2 is a perspective view depicting a using method of the cover material fastening clip according to the illustrative embodiment.
Figure 3:
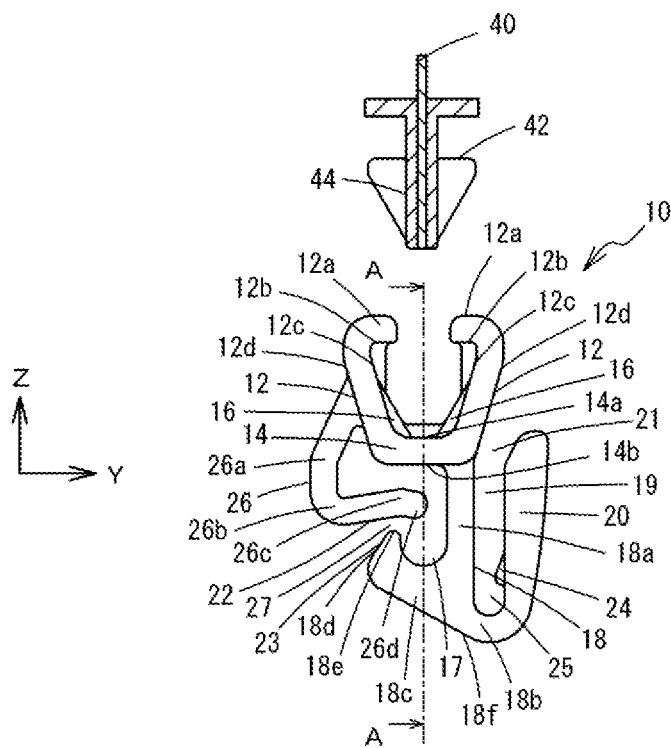
FIG. 3 is a front view depicting a using method of the cover material fastening clip according to the illustrative embodiment.
Figure 4:
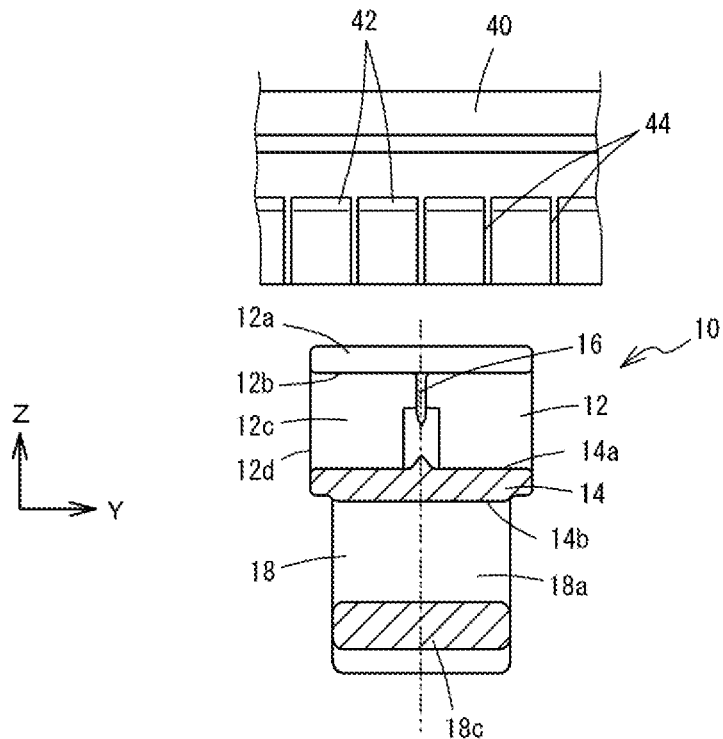
FIG. 4 is a longitudinally sectional view depicting the using method of the cover material fastening clip according to the illustrative embodiment.

Subsequently, a method of using the cover material fastening clip 10 of the illustrative embodiment is described with reference to FIGS. 2 to 7. As shown in FIGS. 2 to 4, the cover material fastening clip 10 is used to stretch the cover material 32 to a predetermined position of a surface of the cushion material 30 for a vehicular seat. Herein, the cushion material 30 and the cover material 32 are described. The cushion material 30 is a synthetic resin foam material such as foamed polyurethane formed into a seat shape. The cushion material 30 is formed with a cover material fastening groove 34. In the groove 34, the wire 36 is disposed. The wire 36 is a metallic wire material, and can be incorporated by insert molding upon molding of the cushion material 30.

The cover material 32 is a synthetic resin sheet or the like configured to cover the surface of the cushion material 30, and has a seam portion 38 at a part corresponding to the groove 34 of the cushion material 30. The seam portion 38 is formed by matching edges of the pair of cover materials 32 to face each other and sewing the same with a locking tape 40 being overlapped. A side edge of the locking tape 40 opposite to the seam portion 38 is integrally provided with a locking end member 42. The locking end member 42 is made of a synthetic resin, has a substantially V-shaped section and is formed along a longitudinal direction of the locking tape 40. The locking end member 42 is mounted to the locking tape 40 by insert-molding one side edge of the locking tape 40. The locking end member 42 has a size with which it can be fitted in the pair of locking claws 12 of the cover material fastening clip 10, and is equidistantly formed with locking grooves 44 along the longitudinal direction of the locking tape 40. The locking groove 44 has a width and a depth within which the stopper 16 of the cover material fastening clip 10 can be inserted therein.

When stretching the cover material 32 to the cushion material 30, the cover material fastening clip 10 is first attached to any position of the locking end member 42 of the locking tape 40 attached to the cover material 32. When a plurality of the cover material fastening clips 10 is equidistantly attached along the longitudinal direction of the locking end member 42 and the locking end member 42 is pushed in between the pair of locking claws 12, the pair of locking claws 12 is expanded with being elastically deformed, so that the locking end member 42 passes therethrough. When the locking end member passes, the elastic deformation of the locking claws 12 is restored, the leading end portions 12a of the pair of locking claws 12 cover an end portion of the locking end member 42 facing toward the seam portion 38-side, and the locking end member 42 is fitted between the pair of locking claws 12 and is not separated therefrom. At this time, the stoppers 16 of the locking claws 12 are inserted into the locking grooves 44 of the locking end member 42 and the cover material fastening clip 10 stops at a predetermined position without moving in the longitudinal direction of the locking end member 42.

Then, the seam portion 38 of the cover material 32 having the cover material fastening clips 10 attached thereto is matched with the groove 34 of the target cushion material 30, and the hook 18 of the cover material fastening clip 10 is contacted to the wire 36 and is then pressed with a finger or the like. At this time, the cover material fastening clip 10 is preferably moved from side to side so that the wire 36 is matched with the wire insertion opening 27. At this state, when the cover material fastening clip 10 is further pushed in, the wire 36 is guided to the guide surfaces 22, 23 of the wire insertion opening 27 along the inclined surface 18f of the claw-shaped portion 18c. When the cover material fastening clip 10 is further pushed and inserted into the groove 34 of the cushion material 30, the wire 36 is positioned in the introduction passage of the guide surfaces 22, 23 facing towards the wire insertion opening 27 and is guided to the wire insertion opening 27. The wire insertion opening 27 is smaller than the diameter of the wire 36, so that the wire 36 cannot pass therethrough as it is. However, at this state, when the cover material fastening clip 10 is pressed from above, the guide piece 26 is elastically deformed, so that the wire insertion opening 27 becomes wider than the diameter of the wire 36. Therefore, the wire passes through the wire insertion opening 27 and enters the wire holding space 17. After the wire 36 passes, the elastic deformation of the guide piece 26 is restored, so that the wire insertion opening 27 returns to its narrow state and the wire 36 is thus prevented from being separated therefrom. Thereby, the cover material fastening clip 10 is locked to the wire 36, and the cover material 32 attached to the cover material fastening clips 10 is attached to the surface of the cushion material 30 with the edge portion thereof being introduced in the groove 34.

Figure 5:
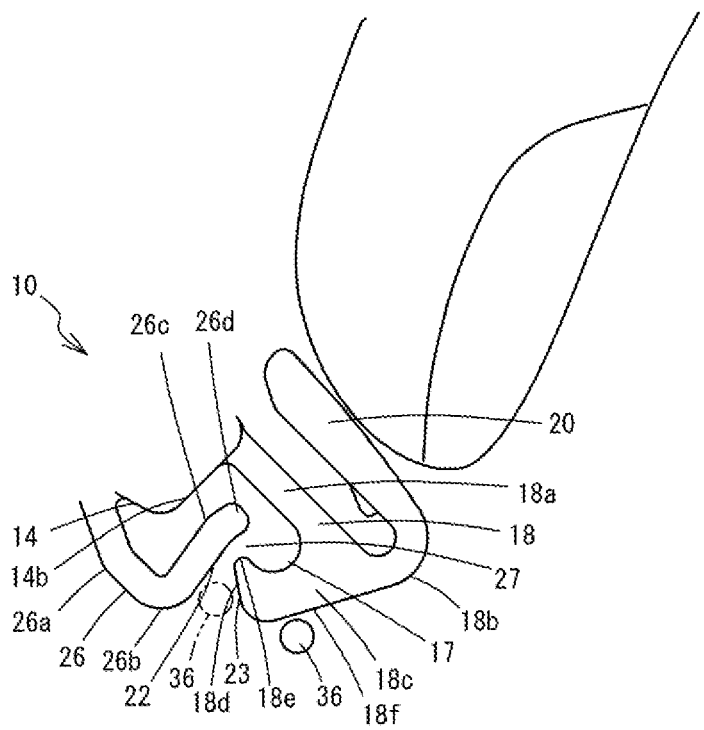
FIG. 5 is a front view depicting a method of attaching the cover material fastening clip according to the illustrative embodiment to a wire.
Figure 6:
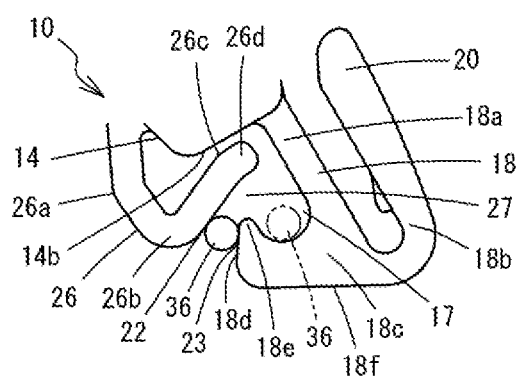
FIG. 6 is a front view depicting the method of attaching the cover material fastening clip according to the illustrative embodiment to the wire.

Also, as shown in FIG. 5, when attaching the cover material fastening clip 10 with a finger tip, even though the wire 36 is located at a right side of the wire insertion opening 27 in FIG. 5, the cover material fastening clip 10 is inclined and the wire 36 thus collides with the flange portion 18b of the hook 18, the wire 36 is guided to the guide surfaces 22, 23 by moving rightward the cover material fastening clip 10, so that the wire is guided into the wire insertion opening 27 and reaches a position of the wire 36 shown with a dashed-two dotted line. At this state, when the cover material fastening clip 10 is pressed from above, the guide piece 26 is elastically deformed from the second bent portion 26b so that it comes close to the locking claw base part 14, as shown in FIG. 6. Thereby, the wire insertion opening 27 is expanded, so that the wire 36 enters and is locked in the wire holding space 17.

Figure 7:
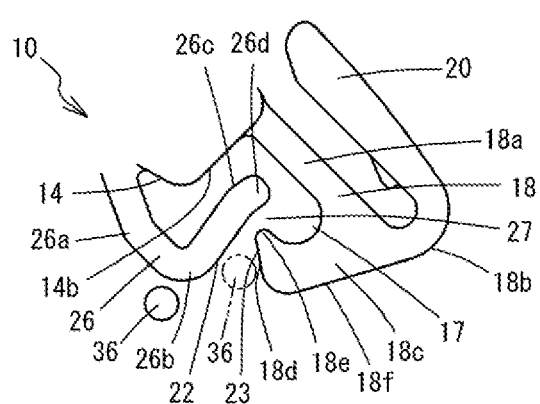
FIG. 7 is a front view depicting another method of attaching the cover material fastening clip according to the illustrative embodiment to the wire.

Also, as shown in FIG. 7, when the wire 36 is located at a left side of the wire insertion opening 27 in FIG. 7, the cover material fastening clip 10 is moved leftwards with the wire 36 colliding with the vicinity of the second bent portion 26b of the guide piece 26, so that the wire is matched with the vicinity of the wire insertion opening 27 and is then put and locked in the wire holding space 17 through the same operations.

When removing the cover material fastening clip 10 from the wire 36, a rod-shaped jig (not shown) is used. The jig is formed to be longer than the groove 19 of the jig support part 20. A leading end of the jig is provided with a locking part. The locking part is formed to be thicker than a gap between an apex of the engaging protrusion 24 provided for the jig support part 20 and the extension portion 18a. The jig is inserted into a side of the groove 34 of the cushion material 30 facing towards the jig support part 20 of the cover material fastening clip 10, and is inserted and pressed between the locking claw 12 and the jig support part 20. Thereby, the locking part provided at the leading end of the jig is contacted to the engaging protrusion 24 of the jig support part 20. At this state, when further pressed, the jig support part 20 is expanded with being elastically deformed. When the locking part passes, the shape of the jig support part 20 is restored, so that the locking part is inserted into the jig holding space 25 below the engaging protrusion 24 and is not separated therefrom.

Then, when the jig is pulled up, moment is applied to the cover material fastening clip 10 so that it rotates in a counterclockwise direction about the wire 36. The wire 36 is guided to the leading end portion 18e of the claw-shaped portion 18c of the hook 18 and to the leading end portion 26d of the guide piece 26 and is positioned in the wire insertion opening 27. At this state, when the cover material fastening clip 10 is further pulled up, the wire 36 collides with the vicinity of the third bent portion 26c of the guide piece 26, so that a force of opening the guide piece 26 is applied because the leading end portion 26d slightly protrudes in a direction away from the locking claw base part 14. Thereby, a part of the guide piece 26 ranging from the second bent portion 26b to the leading end portion 26d is elastically deformed to come close to the locking claw base part 14, so that the wire insertion opening 27 is expanded and the wire 36 finally passes the expanded wire insertion opening 27. Thereby, the cover material fastening clip 10 is removed from the wire 36, and the cover material 32 is removed from the cushion material 30.

According to the cover material fastening clip 10 of the illustrative embodiment, it is possible to link the cover material fastening clip to the wire 36 of the cushion material 30 by the simple operation, thereby attaching the cover material 32 to the cushion material 30 easily and securely. Particularly, when the cover material fastening clip 10 is inserted into the groove 34 of the cushion material 30 by pushing the jig support part 20 with holding the cover material fastening clip 10 by the fingers, the cover material fastening clip is pushed down against the tensile force applied to the cover material 32, so that the cover material fastening clip 10 may be inclined as a whole. However, even at the inclined state, since the wire insertion opening 27 faces downwards and the triangular oblique side-shaped introduction passage formed by the guide surface 22 and the guide surface 23 facing towards the wire insertion opening 27 is expanded downwards, it is possible to easily lock the cover material fastening clip 10 to the wire 36 simply by pressing the wire 36 in the vicinity of the wire insertion opening 27. Even though the wire 36 deviates from the wire insertion opening 27, when the cover material fastening clip 10 is moved from side to side by pressing the same over the wide range as shown in FIG. 5 or 7, the wire 36 is guided to the guide surfaces 22, 23 and is matched with the wire insertion opening 27. That is, the locking operation is simple. Also, since it is not necessary to correctly perform the positioning, it is possible to simply perform the locking operation in the groove 34 of the cushion material 30. Also, it is not necessary to push and deform the cushion material 30 so that the wire 36 is seen. Also, it is possible to effectively perform the locking operation with the weak force, so that a skilled operation is not required and anyone can simply attach the cover material fastening clip. In addition, it is possible to remove the cover material fastening clip 10 from the wire 36 by the jig through the simple operation, so that it is possible to improve the operation efficiency upon the removing.

The locking claws 12 are provided with the stoppers 16. When the stoppers 16 are inserted into the locking groove 44 of the locking end member 42, the cover material fastening clip 10 is locked at a predetermined position, so that it is not moved in the longitudinal direction of the locking tape 40. For this reason, the cover material 32 does not deviate with respect to the cushion material 30 and a wrinkle or slack does not occur in the cover material 32, so that it is possible to cleanly attach the cover material fastening clip, which improves an outward appearance thereof. Since the locking end member 42 is equidistantly provided with the locking grooves 44, the flexibility increases, which facilitates the operation.

Also, the guide piece 26 is provided with the first bent portion 26a, the second bent portion 26b and the third bent portion 26 in the middle thereof, so that it is possible to increase a length of the guide piece 26. As a result, the guide piece is made to be easily bent by the elastic deformation. Since the guide piece 26 is connected to the locking claw 12, it is possible to increase the length thereof, as compared to a configuration where the guide piece is connected to the locking claw base part 14. For this reason, even when the materials and the sectional shapes are the same, the guide piece 26 can be easily elastically deformed and the wire 36 can easily pass therethrough. Since the leading end portion 26d of the guide piece 26 is bent at the third bent portion 26c and protrudes at an angle substantially parallel with the bottom of the wire holding space 17, when removing the cover material fastening clip 10 from the wire 36, it is possible to remove the clip by bringing the wire into contact with the guide piece 26 in a direction intersecting with the extension direction of the leading end portion 26d and thus easily elastically deforming the guide piece 26. At a state where the wire 36 is inserted in the wire holding space 17, it is possible to prevent the wire 36 from being erroneously removed because the leading end portion 26d protrudes at the angle substantially parallel with the bottom of the wire holding space 17.

Figure 8:
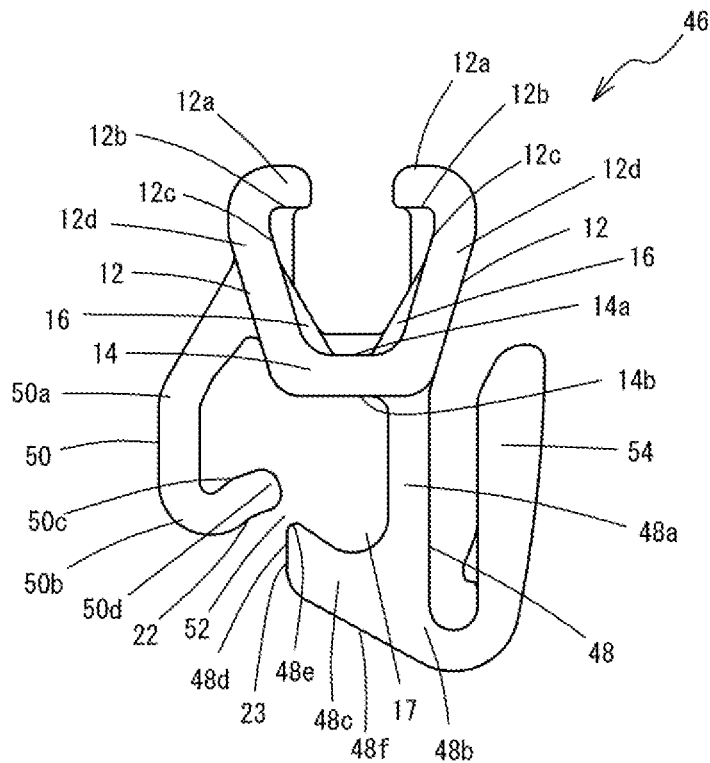
FIG. 8 is a front view depicting a modified embodiment of the cover material fastening clip according to the illustrative embodiment.

In the meantime, the cover material fastening clip 10 of the illustrative embodiment may be configured so that the claw-shaped portion 18c has a different shape and the guide piece 26 is short, as shown in FIG. 8. A cover material fastening clip 46 shown in FIG. 8 has a hook 48 provided on a lower surface 14b (also referred to as the other surface of the locking claw base part 14) opposite to the upper surface 14a. The hook 48 has an extension portion 48a extending downwards in a direction substantially perpendicular to the lower surface 14b and a claw-shaped portion 48c bent leftwards from a leading end of the extension portion 48a and inclined upwardly towards the locking claw base part 14. An end portion of the claw-shaped portion 48c has a shape as if it is cut into a vertical surface 48d substantially perpendicular to an inclined surface 48f, which is a lower surface of the claw-shaped portion 48c. An upper end edge portion of the vertical surface 48d is a leading end portion 48e. The leading end portion 48e does not protrude laterally from the claw-shaped portion 48c and is positioned on a side surface of the claw-shaped portion 48c.

A guide piece 50 is integrally provided for the locking claw 12. The guide piece 50 is provided in the vicinity of an intermediate part in the protrusion direction of the locking claw 12, extends in an inclined direction facing towards a downward side as it is spaced from the locking claw 12, has a first bent portion 50a provided in the vicinity of the lateral side of the lower surface 14b of the locking claw base part 14, is bent at the first bent portion 50a and extends downwards in a vertical direction to be parallel with the extension portion 48a of the hook 48. The guide piece has a second bent portion 50b provided on an extension line of the extension direction of the claw-shaped portion 48c of the hook 48, and is bent at the second bent portion 50b at an angle slightly greater than 90° with respect to the extension direction of the first bent portion 50a towards a boundary between the extension portion 48a and the lower surface 14b. A leading end portion 50d of the bent guide piece 50 reaches a position spaced with a predetermined gap in the vicinity of the leading end portion 48e of the claw-shaped portion 48c. A third bent portion 50c is provided between the second bent portion 50b and the leading end portion 50d of the guide piece 50. The third bent portion 50c is slightly bent to be convex in a direction away from the leading end portion 48e of the claw-shaped portion 48c. A gap between the leading end portion 50d of the guide piece 50 and the leading end portion 48e of the claw-shaped portion 48c becomes a wire insertion opening 52 in which the wire 36 is to be inserted.

The wire insertion opening 52 is set to be smaller than the diameter of the wire 36. A lower surface of the guide piece 50 between the third bent portion 50c and the leading end portion 50d becomes the guide surface 22 inclined towards the wire insertion opening 52. The vertical surface 48d of the leading end-side of the claw-shaped portion 48c becomes also the guide surface 23 perpendicularly facing towards the wire insertion opening 52. A gap between the guide surfaces 22, 23 becomes gradually smaller towards the wire insertion opening 52. Thereby, a triangular oblique side-shaped introduction passage is formed. A leading end of the extension portion 48a of the hook 48 is provided with a flange portion 48b protruding in an opposite direction to the extension direction of the claw-shaped portion 48c. A leading end portion of the flange portion 48b is provided with a jig support part 54.

Figure 9:
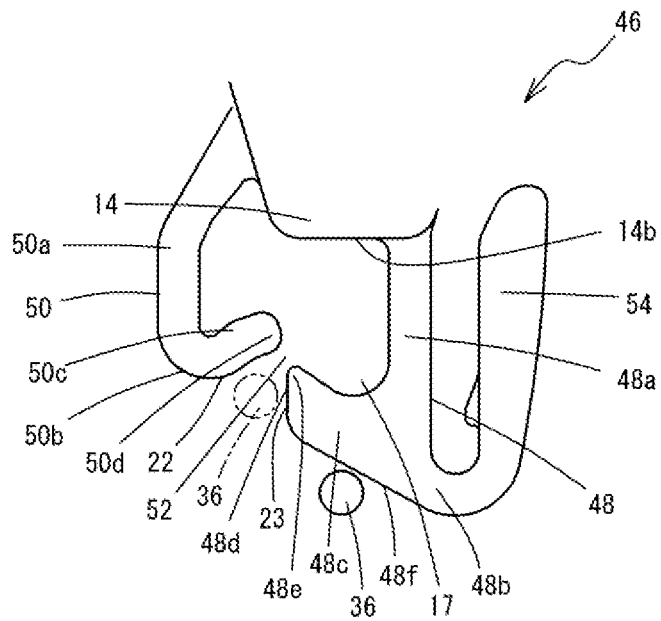
FIG. 9 is a front view depicting a method of attaching the cover material fastening clip of FIG. 8 to the wire.
Figure 10:
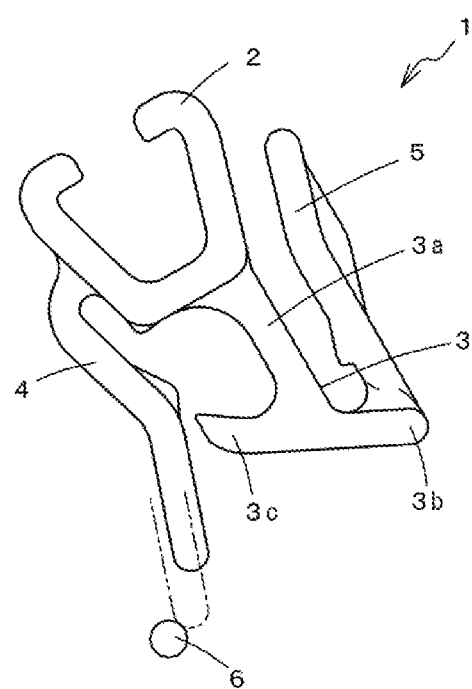
FIG. 10 is a front view depicting a method of attaching a cover material fastening clip of the related art to a wire.

When stretching the cover material 32 to the cushion material 30, the cover material fastening clip 46 is attached to any position of the locking end member 42 of the locking tape 40 attached to the cover material 32. By contacting and pushing the hook 48 of the cover material fastening clip 46 to the wire 36 with the fingers or the like, the cover material fastening clip 46 is moved front side to side so that the wire 36 is matched with the wire insertion opening 52. As shown in FIG. 9, when the wire 36 is located at a right side of the wire insertion opening 52, the cover material fastening clip 46 is moved rightwards with the wire 36 colliding with the inclined surface 48f of the flange portion 48b of the hook 48, so that the wire 36 is matched with the vicinity of the wire insertion opening 52, is guided to the wire insertion opening 52 and is then located at a position shown with the dashed-two dotted line. At this state, when the cover material fastening clip 46 is pressed from above, the guide piece 50 is elastically deformed from the second bent portion 50b so that it comes close to the locking claw base part 14. As a result, the wire insertion opening 52 is expanded, so that the wire 36 enters and is locked in the wire holding space 17.

When removing the cover material fastening clip 46 from the wire 36, the jig is attached to the jig support part 54 of the cover material fastening clip 46 and is then pulled up. Thereby, the moment is applied to the cover material fastening clip 46 so that it rotates about the wire 36, and the wire 36 is guided to the leading end portion 48e of the claw-shaped portion 48c of the hook 48 and to the leading end portion 50d of the guide piece 50 and is positioned in the wire insertion opening 27. At this state, when the cover material fastening clip 46 is further pulled up, the wire 36 elastically deforms outwards the guide piece 50 and the hook 48 to expand the wire insertion opening 52, so that the wire 36 passes the wire insertion opening 52 and the cover material fastening clip 46 is removed from the wire 36.

According to the cover material fastening clip 46 of the illustrative embodiment, it is possible to accomplish the same effects as the cover material fastening clip 10. Since the guide surface 22 of the guide piece 50 from the second bent portion 50b to the leading end portion 50d is short, it is possible to easily remove the cover material fastening clip 46 from the wire 36.

In the meantime, the cover material fastening clip of the present invention is not limited to the above illustrative embodiments, and the specific shapes, sizes and the like can be appropriately changed. The material of the cover material fastening clip, the finishing of the surface, the color and the like can be freely selected. In the cover material fastening clip, the width in the thickness direction intersecting with the facing direction of the pair of locking claws is configured so that the locking claw and the locking claw base part are relatively wide and the hook, the jig support part and the guide piece are relatively narrow. However, the corresponding widths may be the same or may be configured vice versa. However, the guide piece and the jig support part are preferably configured to be narrow so as to secure the deformation performance. The leading end portion of the locking claw is chamfered. However, the leading end portion may be rectangular. However, it is possible to reduce the hooking with the locking end member by the chamfered shape.

DESCRIPTION OF REFERENCE NUMERALS 10, 46: Cover Material Fastening Clip
12: Locking Claw
14: Locking Claw Base Part
16: Stopper
18, 48: Hook
18a, 48a: Extension Portion
18b, 48b: Flange Portion
18c, 48c: Claw-Shaped Portion
18d: Planar Surface
18e, 48e: Leading End Portion
20, 54: Jig Support Part
22, 23: Guide Surface
26, 50: Guide Piece
26a, 50a: First Bent Portion
26b, 50b: Second Bent Portion
26c, 50c: Third Bent Portion
26d, 50d: Leading End Portion
27, 52: Wire Insertion Opening 30: Cushion Material
32: Cover Material
34: Groove
36: Wire
42: Locking End Member
44: Locking Groove

The invention claimed is:

1. A cover material fastening clip comprising:
a locking part configured to be locked to a locking end member provided at an edge of a cover material; and
a hook configured to be locked to a wire disposed in a groove of a cushion material,
wherein the cover material fastening clip is configured to couple the cover material and the cushion material,
wherein the hook is provided below the locking part, and is provided with an extension portion extending downwards from the locking part and a claw-shaped portion bent laterally from a leading end of the extension portion and inclined towards the locking part,
wherein the locking part is provided with a guide piece,
wherein the guide piece extends downwards from the locking part, has a bent portion in the middle thereof and bends and extends laterally towards a leading end portion of the claw-shaped portion of the hook,
wherein a leading end portion of the guide piece reaches a position facing the leading end portion of the claw-shaped portion, with a wire insertion opening having a predetermined gap in which the wire is to be inserted,
wherein parts of the guide piece and the claw-shaped portion facing towards the wire insertion opening are respectively formed with guide surfaces, and
wherein the guide piece is configured such that when the wire enters into the wire insertion opening, the guide piece is elastically deformed so that the leading end portion of the guide piece comes close to the locking part to expand the wire insertion hole.

2. The cover material fastening clip according to claim 1, wherein a gap between the guide surfaces of the guide piece and the claw-shaped portion becomes gradually smaller towards the wire insertion opening.

3. The cover material fastening clip according to claim 1, wherein the leading end portion of the guide piece is located above the leading end portion of the claw-shaped portion.

4. The cover material fastening clip according to claim 3, wherein the leading end portion of the guide piece extends beyond the leading end portion of the claw-shaped portion and is located at a side of the extension portion of the hook.

5. The cover material fastening clip according to claim 1, wherein the claw-shaped portion of the hook has a linear inclined surface, and the bent portion is provided above an extension line along the inclined surface towards the guide piece.

6. The cover material fastening clip according to claim 5, wherein the guide piece extends in a direction away from the extension portion as it goes downwards from the locking part, and is provided with the bent portion so that the guide piece bends and extends towards the leading end portion of the claw-shaped portion of the hook.

7. The cover material fastening clip according to claim 1, wherein the hook has a flange portion extending in an opposite direction to an extension direction of the claw-shaped portion of the extension portion, and
wherein the flange portion has a leading end inclined in a direction away from the locking part, and the leading end of the flange portion is provided with a jig support part configured to lock a jig for removing the hook from the wire.

8. The cover material fastening clip according to claim 1, wherein the locking part, the hook, the jig support part and the guide piece are formed by an integral molding of a synthetic resin.

9. A cover material fastening clip comprising:
a locking part configured to be locked to a locking end member provided at an edge of a cover material; and
a hook configured to be locked to a wire disposed in a groove of a cushion material,
wherein the cover material fastening clip is configured to couple the cover material and the cushion material,
wherein the hook is provided below the locking part, and is provided with an extension portion extending downwards from the locking part and a claw-shaped portion bent laterally from a leading end of the extension portion,
wherein the locking part is provided with a guide piece,
wherein the guide piece extends downwards from the locking part, has a bent portion in the middle thereof and bends and extends laterally towards a leading end portion of the claw-shaped portion of the hook,
wherein a leading end portion of the guide piece reaches a position close to the leading end portion of the claw-shaped portion, with a wire insertion opening having a predetermined gap in which the wire is to be inserted,
wherein parts of the guide piece and the claw-shaped portion facing towards the wire insertion opening are respectively formed with guide surfaces, and
wherein the guide piece is configured such that when the wire enters into the wire insertion opening, the guide piece is elastically deformed so that the leading end portion of the guide piece comes close to the locking part to expand the wire insertion hole.

10. The cover material fastening clip according to claim 9, wherein the leading end portion of the guide piece extends beyond the leading end portion of the claw-shaped portion and is located at a side of the extension portion of the hook.

* * * * *